INCREMENTAL DRIVE MECHANISM

Filed Dec. 30, 1959 3 Sheets-Sheet 1

INVENTORS.
GUNTER H. SCHACHT
LAWRENCE A. WILSON
BY Walter J. Madden Jr.
ATTORNEY

INCREMENTAL DRIVE MECHANISM

United States Patent Office 3,078,732
Patented Feb. 26, 1963

3,078,732
INCREMENTAL DRIVE MECHANISM

Günter H. Schacht and Lawrence A. Wilson, San Jose, Calif., assignors to International Business Machines Corporation, New York, N.Y., a corporation of New York Filed Dec. 30, 1959, Ser. No. 862,922
2 Claims. (Cl. 74—125)

Figure 1:
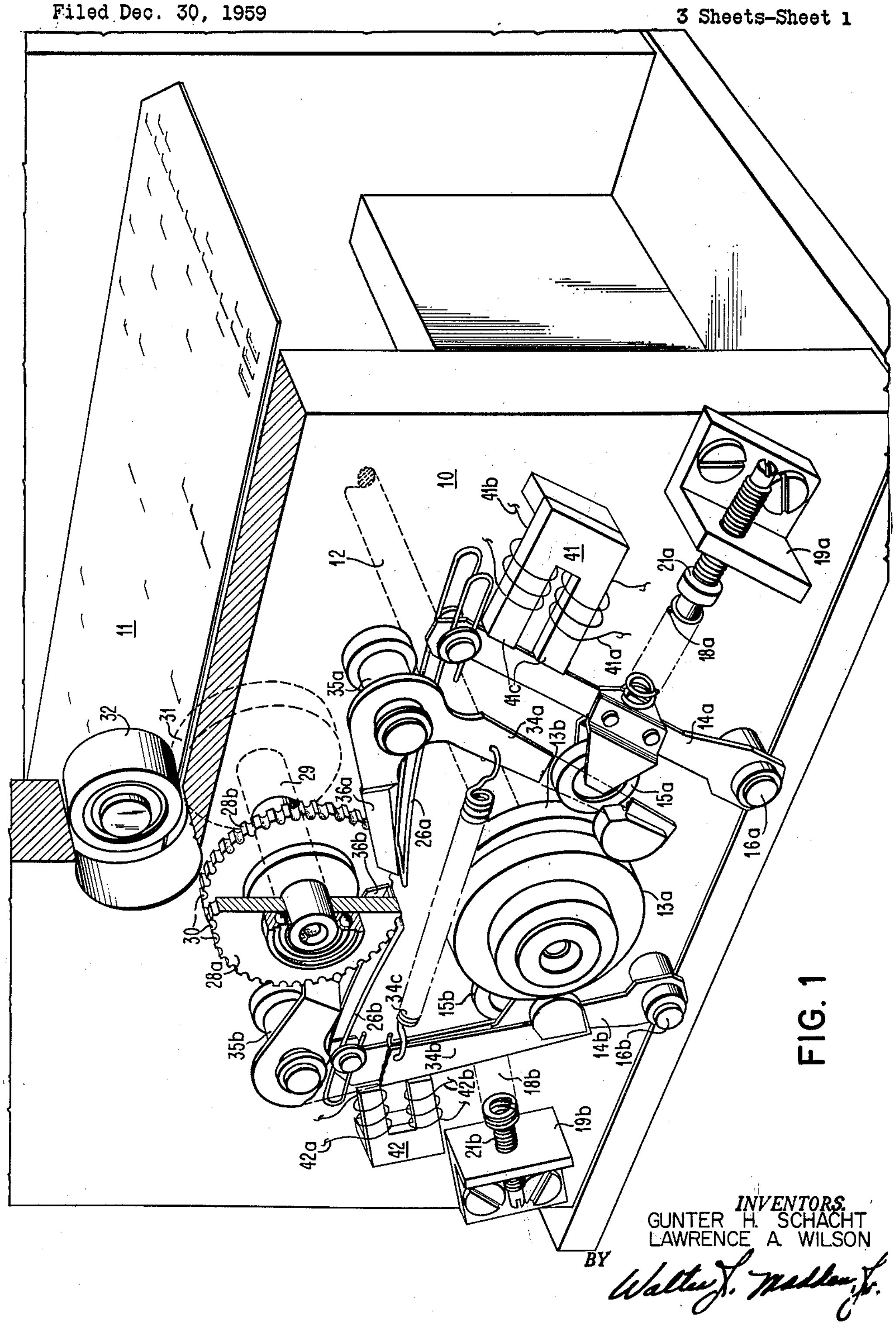

This invention relates in general to incremental drive mechanisms and relates more particularly to such mechanisms for providing incremental motion in two directions.

There are numerous applications where a high speed incremental drive mechanism is required, such as in punched card feeding mechanisms, and in drives for printer carriages in which the carriage must be accurately positioned and stopped at each printing station and must be rapidly moved between adjacent printing stations. Such incremental drive has usually been obtained heretofore by the use of barrel cams, hydraulic drive mechanisms or Geneva-type mechanisms. However, the use of barrel cams is not particularly satisfactory, especially for low cost equipment, since the manufacture of such cams involves expensive and difficult machining and the operation of the cams involves extremely high speeds and accelerations so that they necessarily have considerable wear problems. Similarly, the use of hydraulic drive mechanisms is not satisfactory for low cost equipment owing to the relatively expensive power supplies which such drives require. The Geneva-type mechanism is probably the most common device in use for achieving incremental motion from a rotating shaft, but this type of mechanism has the disadvantage that its displacement-versus-time characteristic is fixed and cannot be readily modified to conform to a desired characteristic. Furthermore, all of the above prior art mechanisms have the problem of excessive heat generation therein when operating at high speeds, with a consequent excessive temperature rise of the parts of the mechanism. This temperature rise results from the fact that part of each drive cycle must be spent accelerating the card or other load and the moving parts of the mechanism, and since these parts must also be decelerated later in the cycle, their kinetic energy is usually fed back into the drive in a very inefficient manner which causes the temperature rise.

Broadly, the present invention contemplates an incremental drive device for providing controlled increments of movement in two directions in response to an input from the rotating shaft. The rotating shaft drives a pair of cams, and one of these cams moves two spring loaded pawl actuating arms back and forth in opposite phase with respect to each other. Each pawl actuating arm is pivoted at one end and is connected at the other end to a pawl member so that the pawl members move back and forth in response to movement of the pawl actuating arms by the cam. Each of the pawls is preferably in the form of a spring member which has one end rigidly fixed to the end of its corresponding pawl actuating arm. The other end of the pawl engages notches in a ratchet which is connected to the load, so that movement of the pawl while it is engaged with a notch imparts driving movement to the load. The other cam on the rotating drive shaft drives a pair of spring loaded pawl lifters which guide the ends of the respective pawls in and out of engagement with the notches at the proper times in the drive cycle.

One of the features of the present invention is the provision in the ratchet of notches which have substantially parallel sides for a substantial portion of the notch depth before becoming rounded at the bottom of the notch. This use of parallel sides of each notch results in the retention of the pawl member in the notch for a considerably longer portion of the drive cycle than would result if the conventional notches having more rounded sides were utilized. By so maintaining the pawls in the notches for a maximum portion of the drive cycle, there results a maximum return of kinetic energy from the decelerating load and other parts of the drive through the pawls to the spring loaded pawl actuating arms. This retention of the pawl members in the notches is particularly important during the deceleration of the load at the end of a drive stroke to insure that kinetic energy involved in decelerating the load is returned through the ratchet and pawl to the spring which is urging the pawl actuating arm in one direction. Thus, the energy from the deceleration of the load in one portion of the cycle is returned to the pawl actuating arm spring where it is stored and then utilized in the next portion of the cycle to urge the pawl actuating arm and pawl forward to perform the subsequent acceleration stroke. This action results in the pawl actuating arm springs serving to alternately store and release energy during the deceleration and acceleration portions of the drive cycle, thus eliminating the generation of large amounts of heat in the other moving parts of the system.

As an additional feature of the present invention, control magnets are associated with each of the pawl actuating arms to selectively latch the arms out of driving operation. The control magnets are positioned so that the associated pawl actuating arm is closely adjacent a magnet when the arm is at its maximum in one direction and when the arm has zero velocity. When a magnet is energized, the associated pawl actuating arm is latched to the magnet when the arm passes closely adjacent thereto and is held latched as long as the magnet remains energized. With one magnet holding its associated pawl actuating arm, the pawl associated therewith does not move in a direction to impart any movement to the ratchet, so that the resultant movement of the ratchet is a series of incremental step motions which are imparted thereto by the other pawl actuating arm. With both control magnets energized, both of the associated pawl actuating arms are latched to their respective magnets so that no motion of the ratchet in either direction results and the ratchet is in the "idle" position but is always detented. When both magnets are de-energized, they have no effect on the pawl actuating arms and both actuating arms follow their normal cycle of operation. Under these last circumstances, there is provided an oscillating incremental drive in which the load is alternately moved backward and forward in incremental motion in an oscillating manner.

Figures 2A, 2B, 2C:
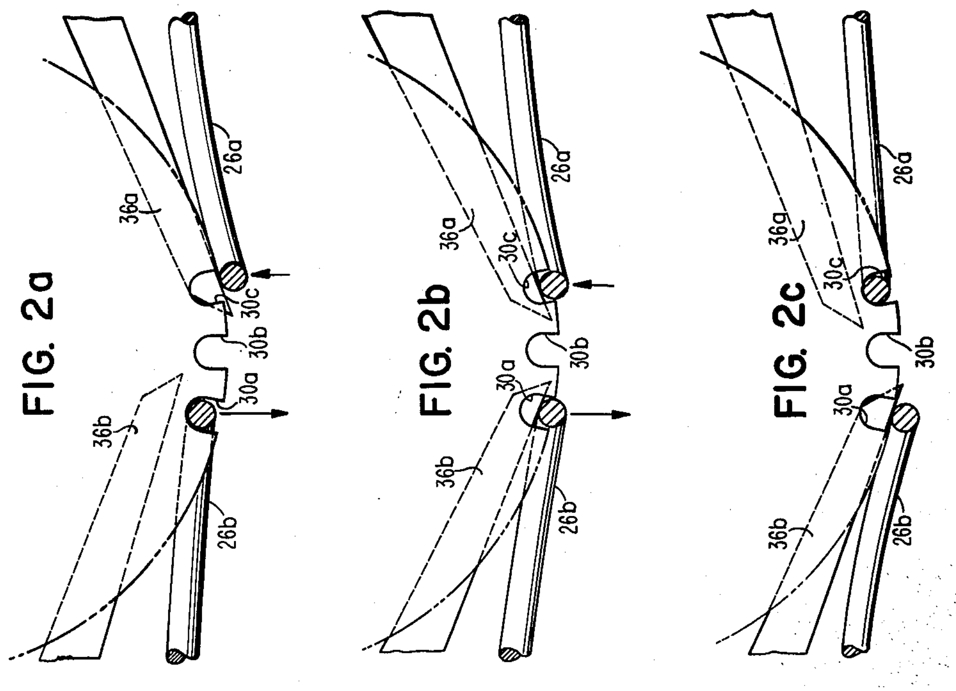
Figure 5:
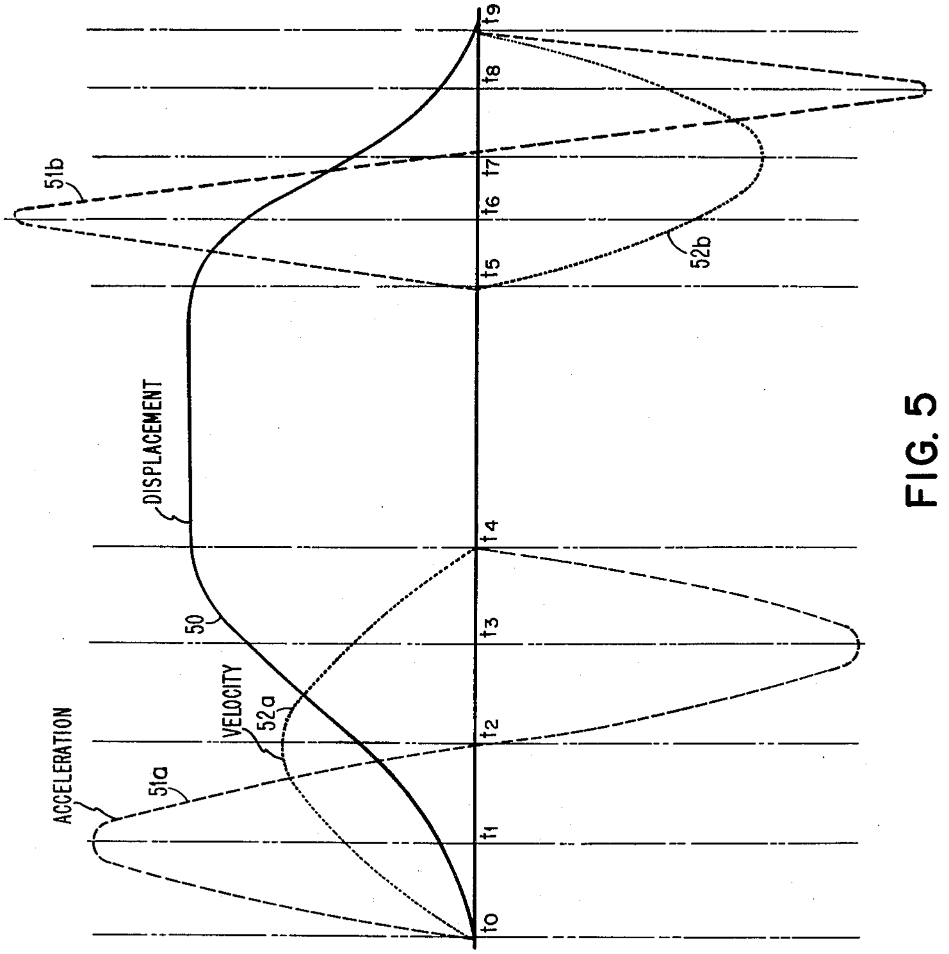

Objects and advantages of the present invention will be apparent from the following description when read in connection with the accompanying drawings in which:

FIGURE 1 is a perspective view illustrating one embodiment of the present invention in connection with an incremental drive for a card feeding mechanism;

FIGURES 2*a*, *b* and *c*, 3*a*, *b*, *c*, *d* and *e* and 4*a*, *b* and *c* are fragmentary views of portions of the ratchet and pawls illustrating representative positions of these elements in different portions of the drive cycle; and FIGURE 5 is a series of graphs showing the variations of pawl arm displacement, acceleration and velocity as a function of the rotation of the drive shaft in a representative operation of the present invention.

Referring to FIGURE 1 by character of reference, there is shown one embodiment of the present invention for imparting incremental motion in either of two directions to a card member 11 such as a punched card. It is assumed that it is desired to drive card 11 either the forward or reverse direction in incremental steps corresponding to the width of a column on the card, and that it is also desired to impart oscillatory movement to card 11 between adjacent columns. The energy for driving card 11 may be supplied from a suitable motive power source such as a continuously running motor (not shown) which drives a drive shaft 12 extending through a base block 10. A pair of cams 13*a* and 13*b* are connected to one end of drive shaft 12. The inner cam 13*b* moves a pair of pawl actuating arms 14*a* and 14*b* by means of rollers 15*a* and 15*b*, respectively, which are coupled to these actuating arms and which ride on the surface of cam 13*b*. Actuating arms 14*a* and 14*b* are pivoted in journal members 16*a* and 16*b* respectively, and each of these arms is urged toward cam 13*b* by associated spring members 18*a* and 18*b*. Springs 18*a* and 18*b* are adjustably connected to mounting blocks 19*a*, 19*b* by set screws 21*a* and 21*b*.

The upper ends of pawl actuating arms 14*a*, 14*b* opposite to their pivoted ends are connected to spring pawl members 26*a*, 26*b* respectively. Pawl members 26*a*, 26*b* may be of any suitable type, but preferably each is in the form of an elongated spring which is bent into a general U-shape and which is securely connected at one end to its associated pawl actuating arm. The other end of each of spring members 26*a*, 26*b* is adapted to engage the notches in a notched ratchet which is shown in the embodiment of FIGURE 1 as a pair of wheels 28*a*, 28*b* having a plurality of notches 30. Wheels 28*a*, 28*b* have their corresponding notches aligned but are spaced from each other to permit pawl lifters to move therebetween to disengage the pawls from the notches, as will be discussed more in detail below. Wheels 28 drive a shaft 29 which is journalled in block 10 and connected to a card feedroll 31. Card 11 is driven by the pressure of a spring loaded idler wheel 32 which works against the intermittently rotating feedroll 31.

Outer cam 13*a* moves a pair of pawl lifting members 34*a* and 34*b* which are adapted to alternately lift their associated spring pawls out of a notch 30 in notched wheels 28. Pawl lifters 34*a* and 34*b* are pivoted at journals 35*a*, 35*b* and are provided with projecting fingers 36*a*, 36*b* which extend between wheels 28*a*, 28*b* to engage the ends of the associated pawls 26*a*, 26*b*. The cammed ends of pawl lifters 34*a*, 34*b* are maintained in contact with the surface of cam 13*a* by a spring 34*c* which is connected to and extends between the pawl lifters.

A pair of control magnets 41, 42 are provided on base 10 for controllably latching the pawl actuating arms 14*a*, 14*b*. Control magnets 41, 42 may be of any suitable type, but preferably they are the type having magnetic pole faces 41*c*, as shown for magnet 41, which touch or are closely adjacent to the associated pawl actuating arm when that arm is in the position represented by arm 14*a* in FIGURE 1. Control magnets 41 and 42 may be of any suitable type magnetically, but preferably each is of the type having a pair of coils 41*a*, 41*b*, 42*a*, 42*b*. Coils 41*a*, 42*a*, which may be termed the "hold" coils are continuously energized and operate to pass a flux through a magnetic circuit including the associated pole pieces and the pawl actuating arm. With only the hold coil of a given magnet energized, when the associated pawl actuating arm comes into contact with the magnet pole face, it will be retained against the pole face, so as to prevent this actuating arm from imparting any driving motion to wheel 28. However, when the associated "buck" coil 41*b*, 42*b* is pulsed while the arms 14*a* or 14*b* are at the polefaces, the magnetomotive force therefrom opposes or bucks the magnetomotive force produced by the associated hold coil to reduce or cancel the effective flux in the magnetic circuit, thus releasing the pawl actuating arm from the pole face. Under these conditions, with both the hold and the buck coils energized, the pawl actuating arm follows a regular path and is not influenced by the control magnet.

The use of the hold and buck coils discussed above for the control magnet has the advantage of permitting very high speed operation of the control without requiring any substantial amounts of energy through the control magnet windings. It will be noted that the control magnets do not perform any work in the sense of attracting or moving the pawl actuating arms. This mechanical work of moving the pawl actuating arms toward the control magnet is performed by cam 13*b* through rollers 15*a*, 15*b*, while the work of urging the actuating arms away from the magnet is performed by springs 18*a*, 18*b*. Thus, the coils of the control magnets are not required to perform any work in the sense of attracting or moving the pawl actuating arms and hence the magnetic fields utilized in the magnet to hold the pawl actuating arms may be much smaller than would be required if the magnets had to move the arms.

The operation of the present invention can perhaps best be visualized by reference to the diagrams of FIGURES 2, 3 and 4 and the graph of FIGURE 5. The views of FIGURES 2, 3 and 4 are not necessarily to scale and are intended only to illustrate the operation of the invention. FIGURES 2*a*, 2*b* and 2*c* are fragmentary views of portions of the notched wheel 28, the pawls 26*a*, 26*b* and the pawl lifters 36*a*, 36*b*, illustrating the operation of the device of FIGURE 1 when it is in the "idle" condition. It will be recalled that in the "idle" condition, both of the pawl actuating arms 14*a*, 14*b* are held latched by their associated control magnets 41, 42. FIGURE 2*a* illustrates the operation as pawl 26*b* is in one notch 30*a* in wheel 28, while pawl 26*a* is about to enter a notch 30*c* spaced two notches from notch 30*a*. Pawl actuating arms 14*a*, 14*b* are not moving since they are latched by their associated control magnets, and the motion imparted to pawls 26*a* and 26*b* to force them alternately in and out of their associated notches is the result of action of pawl lifters 36*a*, 36*b* as these pawl lifters follow cam 13*a*. In FIGURE 2*b*, pawl 26*a* has just entered notch 30*c*, while pawl 26*b* is about to leave notch 30*a*, and in FIGURE 2*c*, pawl 26*a* has entered notch 30*c* while pawl 26*b* is clear of notch 30*a*.

The next position of the pawls would be similar to that shown in FIGURE 2*b* except that the pawls would each be moving in the opposite direction. Pawls 26*a* and 26*b* are thus alternately rocked back and forth by their associated pawl lifters 36*a*, 36*b* to move in and out of the associated slot 30*a*, 30*c*. Under these conditions wheel 28 is not rotating at all and the load driven thereby is also stationary. It will be noted from the diagrams that one or the other of pawls 26*a*, 26*b* is always engaged in one of the slots, so that wheel 28 is always held by one or the other of the pawls. This detenting action of pawls 26*a*, 26*b* is important in insuring that the wheel 28 and the load driven thereby remain accurately detented while the wheel is at rest.

Figures 3A, 3B, 3C, 3D, 3E:
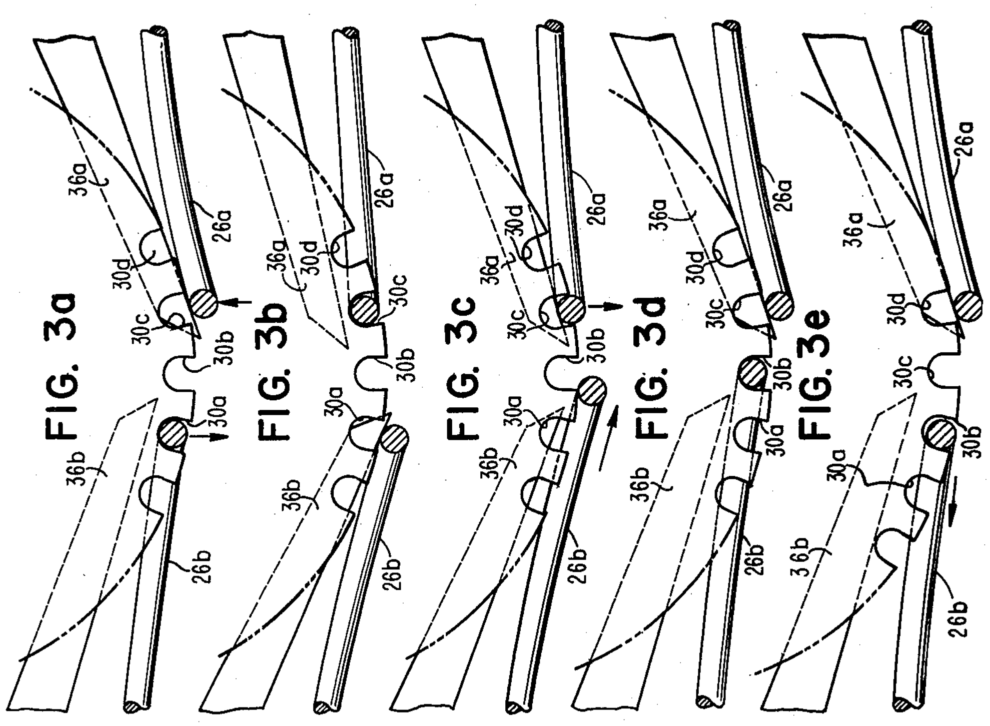

FIGURE 3 illustrates the operation of the present invention when wheel 28 is being incrementally driven in a clockwise direction. Under these conditions, pawl 26*b* will be doing the driving and hence pawl 26*a* will not be effective in the driving cycle. Thus pawl actuating arm 14*a* associated with pawl 26*a* will be held in the latched position by the associated control magnet 41. In FIGURE 3*a*, the driving pawl 26*b* is in slot 30*a* but is about to be lifted therefrom by the associated pawl lifter 36*b*, while the inactive pawl 26*a* is about to enter slot 30*c*. In FIGURE 3*b*, pawl 26*b* has left notch 30*a* under the action of pawl lifter 36*b* and it about to be driven to the right toward slot 30*b*. At this time, the non-driving pawl 26*a* is in slot 30*c* to detent the wheel 28 during movement of a driving pawl 26*b* between adjacent notches. In FIGURE 3*c*, driving pawl 26*b* is approaching notch 30*b*, while non-driving pawl 26*a* is being moved out of notch 30*c* by pawl lifter 36*a*.

In FIGURE 3*d*, driving pawl 26*b* has entered notch 30*b*, while pawl 26*a* has been lifted clear of notch 30*c* by pawl lifter 36*a*. In FIGURE 3*e*, pawl 26*b* is driving wheel 28 in a clockwise direction to move notch 30*b* one increment in a clockwise direction so that the load connected to wheel 28 moves an amount equal to one increment of motion of wheel 28. During this driving of wheel 28 by driving pawl 26*b*, pawl 26*a* of course, is clear of the notches and rides on the surface of the wheel between adjacent notches. At the end of the one increment of motion, pawl 26*b* starts to leave notch 30*b*, which notch now occupies the position which was occupied by notch 30*a* in FIGURES 3*a*, 3*b* and 3*c*. At the same time the non-driving pawl 26*a* enters notch 30*d* to detent the wheel 28. The next step in the drive cycle would then be substantially identical to that shown in FIGURE 3*a*, except that wheel 28 will have been rotated in a clockwise direction one increment of movement so that each of the notches will be displaced one increment of motion in a clockwise direction.

On the basis of the above description for incremental drive in a clockwise direction, it will be readily apparent how the invention operates to produce incremental drive in a counter-clockwise direction. Under these latter circumstances, the control magnet 42 associated with pawl 26*b* would be energized to latch the pawl actuating arm 14*b*, while control magnet 41 associated with pawl 26*a* would not latch the associated pawl actuating arm 14*a* so that pawl 26*a* would be operative to drive wheel 28 in a counter-clockwise direction.

Similarly, the operation of the present invention to provide oscillatory motion in each direction will be apparent from the foregoing description and the diagrams of FIGURE 3. To provide such oscillatory motion, it will be recalled that neither of the control magnets 41, 42 latch their associated pawl actuating arms, 14, so that each of these arms is operative to impart driving motion to its associated pawl. Under these conditions, wheel 28 will be first driven one increment of motion in one direction by one of the pawl members, and then will be returned in the opposite direction an increment of movement by the other driving pawl. Wheel 28 will thus oscillate back and forth in increments of one unit of movement of the wheel to cause the driven load to oscillate.

Figure 4A:
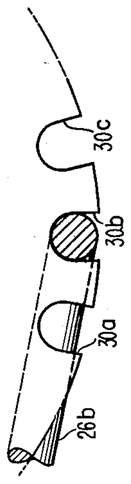

It has been mentioned heretofore that the design of the slots in the driving wheel 28 plays a significant part in enabling the device of the present invention to operate at relatively high speeds without excessive heat generation in the moving parts. The diagrams of FIGURE 4 illustrate the action of these slots in retaining the spring pawl members therein for a maximum length of time, to result in a maximum absorption of kinetic energy in the system. In the diagrams of FIGURE 4, wheel 28 is to be moved one increment of movement to the left, similar to the operation shown diagrammatically in FIGURES 3*a* through 3*e*. In FIGURE 4*a*, the wheel 28 is shown at rest with pawl member 26*b* resting in notch 30*b*. As pawl 26*b* is driven to the left by arm 14*b* and cam 13*b* to accelerate the wheel in a clockwise direction, the pawl exerts a pulling force against the left hand edge of slot 30*b*, as indicated by the arrow. This action accelerates the ratchet wheel in a clockwise direction. Under these conditions of acceleration, the cam 13*b* is driving the pawl and the associated load, while spring 18*b* is under very light compression and hence does not exert any appreciable effect on the system.

Figure 4B:
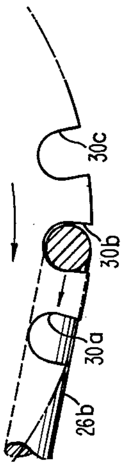
Figure 4C:
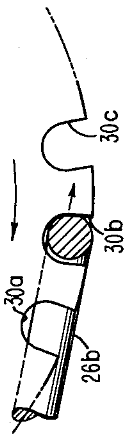

In FIGURE 4*c*, the system is decelerating, under which conditions the pawl 26*b* rides against the right hand edge of slot 30*b* and thus exerts a force toward the right, as indicated by the arrow. At this time, spring 18*b* is under increased compression. Under these conditions spring 18*b* is absorbing the kinetic energy of the decelerating mass in the system and keeps arm 14*b* against the cam to provide controlled deceleration of the load without excessive heat generation in the system. The substantially parallel sides of the notch serve to retain the pawl therein, during this deceleration, so that a maximum amount of kinetic energy is transferred to the spring. This energy which is stored in spring 18*b* during the deceleration cycle will, of course, be returned to the system to accelerate the pawl actuating arm 14*b* and pawl 26*b* during the next cycle of movement.

The relationship between the displacement, acceleration, deceleration and velocity may be best understood from a study of the curves of FIGURE 5, which represent a graphic presentation of the variation of these parameters for actuating arms 14*a* and 14*b*. The solid curve 50 represents the displacement characteristic imparted by cam 13*b* as a function of the degree of its rotation. The dashed curve 51*a* represents the arm acceleration, while the dotted curve 52*a* represents the arm velocity. The displacement curve levels off at $t_4$; from here on the ratchet is at rest until the next cycle. However, the driving arm is at rest only between $t_4$ and $t_5$ and then returns to its starting position at $t_9$.

From a study of FIGURE 5, it will be seen that the acceleration portion of the cycle represented by the interval between time $t_0$ and time $t_2$ corresponds to FIGURE 4*b*, in which pawl 14*b* is exerting an accelerating force to the left against wheel 28. The decelerating portion of the cycle, between times $t_2$ and $t_4$, corresponds to FIGURE 4*c*, in which pawl 26*b* exerts a decelerating force to the right against wheel 28. The acceleration and deceleration characteristics are controlled throughout the cycle to prevent abrupt changes in their value and to thus eliminate abrupt variations in the forces acting on the system.

On the flat part of the cam, represented by the interval between time $t_4$ and $t_5$, there is no change in displacement of the cam so that the pawl arm is at rest against its associated control magnet during this time. It is during this time that the energization circuits for the windings of the magnet may be controlled so as to either latch the actuating arm against the magnet for the remainder of the cycle or to release it for the next step. One method of performing this control is to keep the control magnet hold winding permanently energized so that the arm is latched to the control magnet at time $t_4$ when the arm comes into engagement with or closely adjacent to the control magnet. If the arm is to remain latched, the buck winding is not energized. However, if the arm is not to be latched for the remainder of the cycle, the buck winding may be energized at some time during the period between times $t_4$ and $t_5$ to buck out the flux of the hold coil and thus free the arm from the magnet and permit this arm to follow the came from time $t_5$ to $t_9$.

In the interval between times $t_5$ and $t_9$, the pawl actuating arm must be again accelerated to move the pawl to the next notch. This acceleration is shown by the dashed curve 51*b* between times $t_5$ and $t_9$, while the velocity of the arm during this interval is shown by the dotted curve 52*b*. It will be noted that the time interval between times $t_5$ and $t_9$ is smaller than that between time $t_0$ and $t_4$. This shorter interval results from the fact that the pawl and pawl actuating arm are not driving the wheel 28 during this interval, since the pawl is travelling between adjacent notches to position the pawl for the next step of movement of wheel 28. Thus, the acceleration may be higher for the pawl and pawl actuating arm when they are not driving a load.

Although the above description discussed the present invention in connection with a circular ratchet, it will be readily apparent that other types of ratchets may be utilized with equal facility. For example, a notched bar may be used having a plurality of spaced notches therealong which are successively engaged by the pawl members. Such a construction would again operate to produce an incremental motion of the notched member and its associated load in two directions in response to rotation of the drive shaft.

Similarly, although the present invention was illustrated in connection with a device to provide movement in either of two directions, it will be apparent that a unidirectional incremental drive may be provided by utilizing only one pawl and pawl actuating arm and by providing means to detent the ratchet when the single pawl is out of engagement with a notch.

What is claimed is:

1. Apparatus for producing incremental motion from a rotating shaft comprising a ratchet including a pair of spaced disks having a plurality of aligned notches therein, a first pawl and a second pawl adapted to engage said notches, a first pawl actuating arm and a second pawl actuating arm connected respectively to said first and second pawls, a first cam driven by said shaft for driving said first and said second pawl actuating arms in opposite phase in a cylic manner, a second cam driven by said shaft, and a first and a second pawl lifter driven by said second cam, said pawl lifters extending between said spaced disks to engage said pawls in the center thereof and to lift said pawls out of said notches in opposite phase, said pawl actuating arms and said pawl lifters moving said pawls into and out of engagement with said notches to move said ratchet back and forth in incremental movement as said first and said second cams rotate, each of said pawls being engaged with one of said notches for a portion of a cycle and being disengaged from said one of said notches during the remainder of said cycle, each of said notches having substantially parallel sides for a substantial portion of the depth thereof so as to retain said pawls therein for a substantial portion of said cycle.

2. Apparatus in accordance with claim 1 including means for selectively latching each of said pawl actuating arms to prevent the pawl associated with the latched one of said arms from moving said ratchet.

References Cited in the file of this patent

UNITED STATES PATENTS

| | | |
|---|---|---|
| 305,752 | Kellogg | Sept. 30, 1884 |
| 646,287 | Hundhausen | Mar. 27, 1900 |
| 795,095 | Benoit et al. | July 18, 1905 |
| 2,005,807 | Smith | June 25, 1935 |
| 2,343,549 | Groghan | Mar. 7, 1944 |
| 2,933,931 | Lisinski | Apr. 26, 1960 |
| 2,942,486 | Beguin | June 28, 1960 |